United States Patent [19]

Ishikawa et al.

[11] Patent Number: 5,643,986
[45] Date of Patent: Jul. 1, 1997

[54] POLYIMIDOSILOXANE COMPOSITIONS

[75] Inventors: Seiji Ishikawa; Hiroshi Yasuno; Masayuki Nakatani; Hiroyuki Fukuda; Shigeru Yamamoto, all of Ichihara, Japan

[73] Assignee: Ube Industries, Ltd., Yamaguchi, Japan

[21] Appl. No.: 615,828

[22] Filed: Mar. 14, 1996

[30] Foreign Application Priority Data

| Mar. 17, 1995 | [JP] | Japan | 7-059044 |
| Aug. 22, 1995 | [JP] | Japan | 7-213417 |
| Aug. 22, 1995 | [JP] | Japan | 7-213418 |

[51] Int. Cl.$^6$ .................................................. C08K 5/06
[52] U.S. Cl. .................... 524/366; 524/99; 524/104; 524/167; 524/173; 524/211; 524/351; 524/352; 524/356; 524/379; 524/386; 524/367; 524/233; 524/449; 524/423; 525/423; 525/476; 528/26; 528/28; 528/38
[58] Field of Search ................... 525/423, 476; 528/26, 28, 38; 524/99, 104, 167, 173, 211, 351, 352, 356, 366, 379, 386, 367, 233, 449, 423

[56] References Cited

U.S. PATENT DOCUMENTS

| 4,586,997 | 5/1986 | Lee | 525/426 |
| 4,981,940 | 1/1991 | Konotsune et al. | 528/26 |
| 5,252,703 | 10/1993 | Nakajima et al. | 528/26 |

FOREIGN PATENT DOCUMENTS

| 57-143328 | 9/1982 | Japan . |
| 58-13631 | 1/1983 | Japan . |
| 61-118424 | 6/1986 | Japan . |
| 61-207438 | 9/1986 | Japan . |
| 63-225629 | 9/1988 | Japan . |
| 1-121325 | 5/1989 | Japan . |
| 2-11631 | 1/1990 | Japan . |
| 2-91124 | 3/1990 | Japan . |
| 4-23833 | 1/1992 | Japan . |
| 4-36321 | 2/1992 | Japan . |

*Primary Examiner*—Melvyn I. Marquis
*Attorney, Agent, or Firm*—Finnegan, Henderson, Farabow, Garrett & Dunner, L.L.P.

[57] ABSTRACT

A composition containing 100 parts by weight of a soluble polyimidosiloxane obtained by polymerization and imidation of an aromatic tetracarboxylic acid component and a component comprising a diaminopolysiloxane, an aromatic diamine with a hydroxyl group and optionally another aromatic diamine, 1 to 50 parts by weight of an epoxy resin, and optionally, also 2 to 150 parts by weight of an inorganic filler such as mica, silica or barium sulfate, and an organic solvent. The composition is homogeneously soluble in organic solvents, and when formed into a protective film on a flexible wiring board it has high heat resistance, flexing resistance, adhesion and chemical resistance (against soldering flux and tin plating solutions).

15 Claims, No Drawings

POLYIMIDOSILOXANE COMPOSITIONS

BACKGROUND OF THE INVENTION

1. Field of the Invention

The present invention relates to polyimidosiloxane solution compositions which are mixtures of an organic solvent-soluble polyimidosiloxane, an epoxy resin and an organic solvent, and optionally also mica or barium sulfate, as well as to cured products thereof. The compositions have excellent storage stability, and may be suitably used for such purposes as printing inks and application varnishes to allow screen printing on flexible wiring boards, formation of protective films by using dispensers, etc.

When a polyimidosiloxane composition according to the present invention is applied onto a substrate in the form of a solution and allowed to dry and harden to form a protective film, the protective film has excellent flexibility (flexing resistance), heat resistance, adhesive properties, chemical resistance (particularly against soldering flux and tin plating solutions) and soldering resistance and is adherent to substrates, for example, polyimide film, copper foil, etc., allowing formation of an excellent protective film without requiring pretreatment of the substrate with a silane coupling agent or another adhesion accelerator.

2. Description of the Related Art

The use of aromatic polyimides, epoxy resins and the like in electrically insulating protective films has been known for such applications as solid-state insulating films, passivation films, and insulating films for semiconductor integrated circuits and flexible wiring boards.

Epoxy resins generally require the use of a curing agent, which has raised a number of problems including the storage stability of the curing agent and its manageability for two-pack preparations, and when used for insulating films as mentioned above, the insulating films formed by thermosetting are rigid, thus lacking flexibility.

Furthermore, since most polyimidosiloxanes are poorly soluble in organic solvents, it is necessary to use a solution of the polyimidosiloxane precursor (polyamic acid), as described in Japanese Unexamined Patent Publication (Kokai) Nos. 57-143328, 58-13631 and 2-11631, to form a coated solution layer, and then accomplish drying and imidation of the coated layer by prolonged high-temperature heating to form a polyimide protective film, which process has resulted in the problem of heat deterioration of the electronic material which is to be protected.

Polyimidosiloxanes soluble in an organic solvents are also known as described in Japanese Unexamined Patent Publication (Kokai) Nos. 61-118427, 61-207438, 63-225629, 1-121325, 2-91124, 4-23833 and 4-36321, but have disadvantages in that curl occurs in the flexible substrates, resistance to soldering flux is poor, and viscosity stability is poor.

SUMMARY OF THE INVENTION

It is an object of the present invention to provide polyimidosiloxane compositions (solution compositions) which have high solubility in organic solvents while also having heat resistance, curl resistance and adhesion when used to form protective films, which are well compatible with epoxy resins and do not adversely affect adhesives between copper foil and electrical insulating material, etc., and which readily form protective films with heat resistance, chemical resistance (particularly against soldering flux and tin plating solutions) and flexing resistance. The solution composition has storage stability.

Specifically, the present invention provides polyimidosiloxane compositions containing 100 parts by weight of (a) an organic solvent-soluble polyimidosiloxane consisting of structural units represented by the general formula (1)

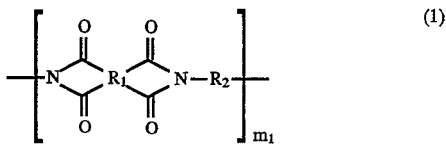

general formula (2)

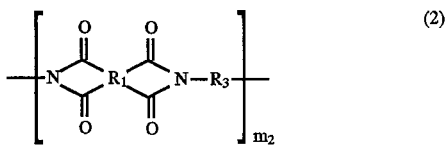

and general formula (3)

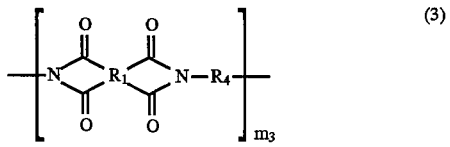

wherein $R_1$ represents a tetravalent residue of an aromatic tetracarboxylic acid without the tetracarboxylic acid, $R_2$ represents a divalent residue of a diaminopolysiloxane having the general formula (4) below without the amino groups, $R_3$ represents a divalent residue of an aromatic diamine compound represented by the general formula (5) below without the amino groups, $R_4$ represents a divalent residue of a diamine compound other than the diamine compounds represented by general formulas (4) and (5) without the amino groups (in formula (4) $n_1$ is 3 to 30, each $R_5$ independently represents a divalent hydrocarbon group and each $R_6$ independently represents an alkyl group of 1–3 carbon atoms or a phenyl group, in formula (5) X represents a direct bond or a divalent group represented by the general formula (6) below, $r_1$ represents a hydroxy group, $n_2$ represents 1 or 2 and $n_3$ represents zero or an integer of 1 to 3, and in formula (6) $R_7$ and $R_8$ each independently represent hydrogen, methyl or halogenated methyl), and the respective proportions of $m_1$, $m_2$ and $m_3$ with respect to a total of 100 mole percent are 45 to 80 mole percent for $m_1$, 0.5 to 40 mole percent for m, and the remainder for $m_3$, General formula (4)

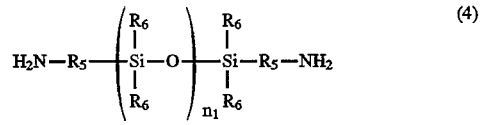

General formula (5)

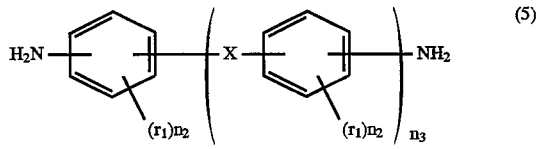

General formula (6)

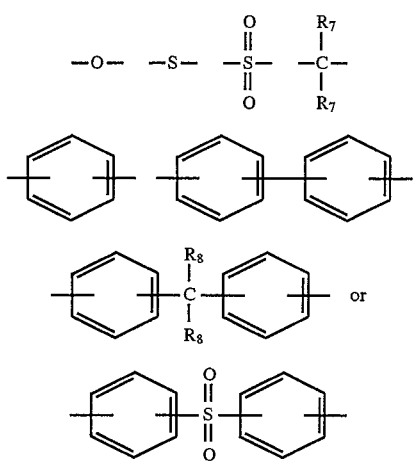

1 to 50 parts by weight of (b) an epoxy resin, and an organic solvent.

The present invention further provides heat-cured products of polyimidosiloxane compositions containing 100 parts by weight of (a) an organic solvent-soluble polyimidosiloxane consisting of structural units represented by the aforementioned general formula (1), general formula (2) and general formula (3), 1 to 50 parts by weight of (b) an epoxy resin, and an organic solvent.

The present invention still further provides coating compositions and their cured products, wherein the polyimidosiloxane is soluble in organic solvents, have an epoxy group-reactable polar group in the molecule, and are prepared by dissolving a polyimidosiloxane with a inherent viscosity of 0.16 to 2 and an epoxy resin in an organic solvent, and wherein the viscosity change coefficient of the solution composition is no greater than 1.5 and the cured products have satisfactory soldering resistance and tin plating resistance.

DESCRIPTION OF THE PREFERRED EMBODIMENTS

The polyimidosiloxane according to the invention may be obtained by heating imidation or chemical imidation from an aromatic tetracarboxylic acid or a derivative (dianhydride, ester, etc.) thereof, a diaminopolysiloxane represented by the aforementioned general formula (4) and a diamine compound represented by the aforementioned general formula (5), in an organic solvent.

According to the present invention, the aromatic tetracarboxylic acid used is an aromatic tetracarboxylic acid containing 80 mole percent or more, and especially 85-100 mole percent, of 2,3,3',4'-biphenyltetracarboxylic acid, 3,3', 4,4'-biphenyltetracarboxylic acid, 3,3',4,4'-diphenylethertetracarboxylic acid, 3,3',4,4'-diphenylsulfonetetracarboxylic acid, 3,3',4,4'-benzophenonetetracarboxylic acid, 2,2-bis(3,4-benzenecarboxylic acid) hexafluoropropane, pyromellitic acid, 4-bis(3,4-benzendicarboxylic acid) benzene, 2,2-bis[4-(3,4-phenoxydicarboxylic acid)phenyl] propane, or an anhydride or lower alcoholester thereof.

Particularly preferred among these are 2,3,3',4'-biphenyltetracarboxylic acid and 3,3',4,4'-diphenylethertetracarboxylic acid because of their excellent solubility in the organic solvent for the aforementioned polyimidosiloxane, and of their excellent heat resistance.

According to the invention, the diaminopolysiloxane represented by general formula (4) is one wherein each $R_5$ in the formula independently represents a divalent hydrocarbon group, particularly an alkylene group of 2 to 6, and preferably 3 to 5 carbon atoms, or a phenylene group, each $R_6$ independently represents an alkyl group of 1 to 3 carbon atoms, specifically methyl, ethyl or propyl, or a phenyl group, and $n_1$ is an integer of 3 to 30, and preferably 3 to 20.

It is not preferred for $n_1$ to be a low value since this results in a high curling tendency, while too large a value of $n_1$ results in low chemical resistance, lower reactivity with the aromatic tetracarboxylic acid component, a low molecular weight of the resultant polyimidosiloxane, a low solubility in organic solvents and poor compatibility with other organic compounds, for which reasons the above ranges are appropriate.

Specific examples of diaminopolysiloxanes include α,ω-bis(2-aminoethyl)polydimethylsiloxane, α,ω-bis(3-aminopropyl)polydimethylsiloxane, α,ω-bis(4aminophenyl)polydimethylsiloxane, α,ω-bis(4-amino-3-methylphenyl)polydimethylsiloxane, α,ω-bis(3-aminopropyl)polydiphenylsiloxane, α,ω-bis(4-aminobutyl) polydimethylsiloxane, and the like.

According to the invention, the diamine compound represented by general formula (5) may be, for example, a diaminophenol compound such as 2,4-diaminophenol; a diaminohydroxybiphenyl compound such as 3,3'-diamino, 4,4'-dihydroxybiphenyl, 4,4'-diamino,3,3'-dihydroxybiphenyl, 4,4'-diamino,2,2'-dihydroxybiphenyl, 4,4'-diamino,2,2',5,5'-tetrahydroxybiphenyl; a diaminohydroxydiphenylalkane compound such as 3,3'-diamino,4,4'-dihydroxydiphenylmethane, bis(4-amino,3-hydroxyphenylmethane, bis(4-amino,2-hydroxyphenylmethane, 2,2-bis[3-amino,4-hydroxyphenyl] propane, 2,2-bis[4-amino,3-hydroxyphenyl]propane, 2,2-bis [3-amino,4-hydroxyphenyl]hexafluoropropane, 4,4'-diamino,2,2',5,5'-tetrahydroxydiphenylmethane; a diaminohydroxydiphenyl ether compound such as 3,3'-diamino,4,4'-dihydroxydiphenyl ether, 4,4'-diamino,3,3'-dihydroxydiphenyl ether, 4,4'-diamino,2,2'-dihydroxydiphenyl ether, 4,4'-diamino,2,2',5,5'-tetrahydroxybiphenyl ether; a diaminohydroxydiphenylsulfone compound such as 3,3'-diamino,4,4'-dihydroxydiphenylsulfone, 4,4'-diamino,3,3'-dihydroxydiphenylsulfone, 4,4'-diamino,2,2'-dihydroxydiphenylsulfone, 4,4'-diamino,2,2',5,5'-tetrahydroxybiphenylsulfone; a bis(aminohydroxyphenoxyphenyl) alkane compound such as 2,2-bis[4-(4-amino,3-hydroxyphenoxy)phenyl]propane; a bis(aminohydroxyphenoxy)biphenyl compound such as 4,4'-bis(4-amino,3-hydroxyphenoxy)biphenyl; or a bis(aminohydroxyphenoxyphenyl)sulfone compound such as 2,2-bis[4-(4-amino,3-hydroxyphenoxy)phenyl]sulfone. Most preferred as the compound represented by general formula (5) is a diamine compound with 1 to 8 —OH groups for satisfactory viscosity stability (prolonged storage stability).

According to the present invention, $R_4$ in general formula (3) represents a divalent residue of a diamine compound ($H_2N-R_4-NH_2$) other than the diamine compounds represented by general formulas (4) and (5), without the amino groups.

The diamine compound ($H_2N-R_4-NH_2$) may be, for example, a diamine with one benzene such as 1,4-diaminobenzene, 1,3-diaminobenzene, 2,4-diaminotoluene, 1,4-diamino,2,5-dihalobenzene; a diamine with 2 benzenes such as bis(4-aminophenyl) ether, bis(3-aminophenyl) ether, bis(4-aminophenyl)sulfone, bis(3-aminophenyl)sulfone, bis (4-aminophenyl)methane, bis(3-aminophenyl)methane, bis (4-aminophenyl) sulfide, bis(3-aminophenyl) sulfide, 2,2-bis (4-aminophenyl)propane, 2,2-bis(3-aminophenyl)propane, 2,2-bis(4-aminophenyl)hexafluoropropane, o-dianisidine, o-tolidine and tolidinesulfone; diamines with 3 benzenes such as 1,4-bis(4-aminophenoxy)benzene, 1,4-bis(3-aminophenoxy)benzene, 1,4-bis(4-aminophenyl)benzene, 1,4-bis(3-aminophenyl)benzene, α,α'-bis(4-aminophenyl)-1,4-diisopropylbenzene and α,α'-bis(4-aminophenyl)-1,3-diisopropylbenzene; diamines with 4 or more benzenes such as 2,2-bis[4-(4-aminophenoxy)phenyl]propane, 2,2-bis[4-(4-aminophenoxy)phenyl]hexafluoropropane, 2,2-bis[4-(4-aminophenoxy)phenyl]sulfone, 4,4'-(4-aminophenoxy) biphenyl,9,9-bis(4-aminophenyl)fluorene and 5,10-bis(4-aminophenyl)anthracene; and other diamine compounds.

Hexamethylenediamine, diaminododecane and other aliphatic diamine compounds may be used in combination with the above-mentioned diamines.

According to the present invention, the proportions of the units of general formulas (1), (2) and (3) used in the polyimidosiloxane component are 45 to 80 mole percent, 0.5 to 40 mole percent and the remaining portion, respectively, which are preferably 45 to 75 mole percent, 1 to 40 mole percent and 0 to 50 mole percent, respectively, and more preferably 50 to 75 mole percent, 5 to 35 mole percent and 5 to 45 mole percent, respectively. It is not suitable for any of the components to be present outside of these ranges in too large or too small an amount, since the resultant polyimidosiloxane will have lower solubility in organic solvents, poorer compatibility with other organic compounds, will undergo considerable curling during formation of a protective film on a flexible wiring board, and will have lower heat resistance.

The polyimidosiloxane according to the invention may be obtained, for example, by one of the following methods.

(1) A method wherein an aromatic tetracarboxylic acid component and diamine components including a diaminopolysiloxane and an aromatic diamine in substantially equimolar amounts are subjected to continuous polymerization and imidation at 15° to 250° C. in an organic polar solvent to obtain the polyimidosiloxane.

(2) A method wherein the diamine components are separated, and first an excess of the aromatic tetracarboxylic acid is polymerized and imidated with the diaminopolysiloxane in an organic polar solvent at 15° to 250° C. to prepare an imidosiloxane oligomer with an average polymerization degree of about 1 to 10 having acid or acid anhydride groups at the ends, the aromatic tetracarboxylic acid is separately polymerized and imidated with an excess of the aromatic diamine in an organic polar solvent at 15° to 250° C. to prepare an imidooligomer with an average polymerization degree of about 1 to 10 having amino groups at the ends, and then both oligomers are mixed at approximate molar equivalents of the acid component and the diamine components and reacted at 15° to 60° C., after which the temperature is raised to 130° to 250° C. to obtain a block-type polyimidosiloxane.

(3) A method wherein approximate molar equivalents of the aromatic tetracarboxylic acid component and the diamine components including the diaminopolysiloxane and the aromatic diamine are first polymerized at 20° to 80° C. in an organic polar solvent to obtain a polyamic acid, and this is followed by imidation to obtain a polyimidosiloxane.

As organic polar solvents used to obtain the above-mentioned polyimidosiloxane there may be mentioned nitrogen-containing solvents, for example, N,N-dimethylacetoamide, N,N-diethylacetoamide, N,N-dimethylformamide, N,N-diethylformamide, N-methyl-2-pyrrolidone, 1,3-dimethyl-2-imidazolidinone, N-methylcaprolactam, etc.; solvents containing a sulfur atom, for example, dimethylsulfoxide, diethylsulfoxide, dimethylsulfone, diethylsulfone, hexamethylsulfonamide, etc.; phenol-based solvents, for example, cresol, phenol, xylenol, etc.; diglyme-based solvents, for example, diethyleneglycoldimethylether (diglyme), triethyleneglycoldimethylether (triglyme), tetraglyme, etc.; solvents containing an oxygen atom in the molecule, for example, acetone, methanol, ethanol, ethylene glycol, dioxane, tetrahydrofuran, etc.; as well as pyridine, tetramethylurea, etc.

If necessary an aromatic hydrocarbon-based solvent such as benzene, toluene or xylene, or another organic solvent such as solvent naphtha, benzonitrile, etc. may be used in combination therewith.

According to the present invention, the polyimidosiloxane used may be one obtained by any of the aforementioned methods (1) to (3), but is preferably one with a high molecular weight, a high imidation ratio, solubility in organic polar solvents to at least 3 wt %, and preferably to a higher concentration within about 5 to 60 wt % and particularly 5 to 50 wt %, and a solution viscosity at 25° C. (measured with an E-rotational viscometer) of 0.01 to 10,000 poise, and particularly 0.1 to 1,000 poise.

The imidation ratio of the polyimidosiloxane is preferably 90% or greater and particularly 95% or greater, and an inherent viscosity as a measure of the molecular weight (measuring concentration: 0.5 g/100 ml, solvent: N-methyl-2-pyrrolidone, measuring temperature: 30° C.) of 0.16 or greater, preferably 0.17 or greater and especially 0.17 to 2, is preferred from the standpoint of storage stability (viscosity change coefficient) of the polyimidosiloxane solution composition and soldering resistance and tin plating resistance of the cured product.

The epoxy resin to be used according to the invention (hereunder sometimes referred to simply as "epoxy") preferably is a liquid or solid epoxy resin with an epoxy equivalent on the order of 100–1000 and a molecular weight of approximately 300–5000. Examples thereof are bisphenol A-type and bisphenol F-type epoxy resins (Epikote 806, Epikote 825, products of Yuka Shell) and trifunctional or greater epoxy resins (Epikote 152, Epikote 154, Epikote 180 series, Epikote 157 series, Epikote 1032 series, products of Yuka Shell; MT0163, product of Ciba Geigy, etc.).

According to the invention, the epoxy resin is used in an amount of 1 to 50 parts by weight, and preferably 5 to 40 parts by weight, to 100 parts by weight of the polyimidosiloxane. Such a range is preferred because too excessive an amount or too limited an amount will result in gelation of the composition and poor heat and chemical resistance after curing.

The epoxy resin may also be used in combination with added components, such as hydrazides or imidazoles, to accelerate its curing.

According to the present invention, at least one inorganic substance selected from mica and barium sulfate is preferably used, and although the mica or barium sulfate may be of any size or form, it preferably has an average particle size of 0.1 to 25 μm, such as HiMod450 (average particle size: 17 μm) and C-4000 (average particle size: 22 μm) manufactured by Shiraishi Industries, KK., or MK-100 (average particle size: 2.6 μm) manufactured by Cope Chemicals, KK. Preferred for barium sulfate are, for example, B-30 and B-54 manufactured by Sakai Industries, KK. It is not preferred for the particle size to be outside of this range, since the resultant coated film will be prone to cracking when bent, or the bent sections will become whitened.

According to the present invention, the mica or barium sulfate is preferably used in a total amount of 2 to 150 parts by weight, preferably 5 to 150 parts by weight, and more preferably 10 to 100 parts by weight, per 100 parts by weight of the polyimidosiloxane, among which 10 to 80 parts by weight is an even more preferred range. Such a range is preferred because too excessive an amount or too limited an amount will result in cracking of the coated film when bent, as well as poor soldering heat resistance and higher copper foil coloration.

A silicone-based viscosity-controlling component, for example, Aerosil (fine silica) manufactured by Nihon Aerosil, is preferably added at 1 to 50 parts by weight, and especially 5 to 40 parts by weight, per 100 parts by weight of the polyimidosiloxane.

According to the present invention, the polyimidosiloxane solution composition may be easily obtained by uniformly stirring and mixing prescribed amounts of the polyimidosiloxane and the epoxy resin, and depending on the case, also mica or barium sulfate. The mixing may be performed in an appropriate organic solvent to prepare a polyimidosiloxane solution composition. The solution composition may also be dissolved in the solvent after mixing. The polyimidosiloxane may be the polyimidosiloxane polymerization solution or the polymerization solution diluted with an appropriate organic solvent. The organic solvent may be one of the organic polar solvents mentioned previously for obtaining the polyimidosiloxane and preferably has a boiling point of 140° C. or higher, while organic solvents with boiling points of 180° C. and higher, and especially 200° C. and higher (for example, methyltriglyme) are ideal for use since this drastically reduces the degree of dispersion due to evaporation of the solvent, and thus they may be satisfactorily used in printing inks for screen printing.

The concentration of the above-mentioned polyimidosiloxane solution composition may be 5 to 60 wt % and preferably 5 to 50 wt %, with 10 to 45 wt % being most suitable, and a solution viscosity of 0.01 to 10,000 poise, and preferably 0.1 to 3000 poise is most suitable from the viewpoint of manageability and solution properties, and the characteristics of the protective film.

A protective film consisting of a cured product formed from the polyimidosiloxane composition of the invention has excellent mechanical strength and electrical insulative properties heat resistance and chemical resistance (resistance against soldering flux and tin plating solutions). And, a protective film may thus be suitably used as a protective film or interlayer insulating film for various electrical and electronic parts (particularly flexible wiring boards). The composition may be coated onto the surface of an object (such as a flexible circuit board or semiconductor) by a coating method which employs a rotating applicator, dispenser or printer, either at room temperature or high temperature. The coated film may be dried at a temperature of 50° C. or higher, preferably about 110° C. or higher, and particularly from 120° to 180° C., to form a cured film (thickness of protective film: approx. 0.5 to 500 μm).

Where the inorganic substance selected from mica or barium sulfate is used, even if the filler settles during the storage for a long period of time, the composition can be used since it has again the original viscosity by uniform stirring.

Examples and comparative examples are provided below for more detailed explanation of the invention. The measurements and evaluations for the examples were made according to the methods described below.

The compounds used in the examples which follow are listed here with their abbreviations.

a-BPDA: 2,3,3',4'-biphenyltetracarboxylic dianhydride

ETDA: 3,3',4,4'-diphenylethertetracarboxylic dianhydride

DSDA: 3,3',4,4'-diphenylsulfonetetracarboxylic dianhydride

6FDA: 2,2-bis(3,4-benzenedicarboxylic anhydride) hexafluoropropane

PSI: α,ω-bis(3-aminopropyl)polydimethylsiloxane

HAB: 4,4-diamino-3,3'-dihydroxybiphenyl

MBHA: bis(4-amino-3-hydroxyphenyl)methane

FF: 2,2-bis(3-amino-4-hydroxyphenyl) hexafluoropropane

DABA: 3,5-diaminobenzoic acid

TPEQ: 1,4-(4-aminophenoxy)benzene

BAPP: 2,2-bis[4-(4-aminophenoxy)phenyl]propane

TG: triglyme

Measurement of inherent viscosity ($\eta$inh)

The inherent viscosity ($\eta$inh) of the polyimidosiloxane reaction solution may be expressed by the following equation:

$$\eta\text{inh}=\ln(t/t_0)/c$$

where t is the time (sec) between bench marks for the measured solution according to a Cannon-Fenske viscometer, $t_0$ is the time (sec) between bench marks for a pure solution according to a Cannon-Fenske viscometer, and c is the concentration (g/100 ml solution) of the polyimidosiloxane solid portion.

The viscosity was measured using an N-methyl-2-pyrrolidone solvent at 30° C., with a polyimidosiloxane solid concentration of 0.5 g/100 ml.

Measurement of average particle size

The average particle size of the mica was determined using a particle size distribution meter.

C-4000 (average particle size: 22 μm) manufactured by Shiraishi Industries, KK. and MK-100 (particle size: 1–10 μm, average particle size: 2.6 μm, as measured with a particle size distribution meter) manufactured by Cope Chemicals, KK. were used as the mica.

The average particle size of the barium sulfate was determined by electron microscope observation.

B-30 (average particle size: 0.3 μm) and B-54 (average particle size: 1.2 μm), manufactured by Sakai Industries, were used as the barium sulfate.

Measurement of soldering heat resistance

Two spacers of a 50 μm-thick polyimide film were placed at both sides on the smooth surface of a 35 μm-thick electrolytic copper foil, and the polyimidosiloxane solution (composition) was cast thereon and heated to dryness at 80° C. for 30 minutes and at 160° C. for 60 minutes, to form a protective film of the polyimidosiloxane composition. A 3×3 cm piece was cut out of the copper foil on which the polyimidosiloxane protective film had been formed, and a rosin-based flux (SUNFLUX SF-270, manufactured by Sanwa Chemical Industries) was applied onto the protective film, after which the protective film side was contacted with a molten solder bath at 260° C. for 30 seconds, cooled, and then observed and evaluated for any swelling of the protective film.

o: absolutely no swelling, Δ: slight swelling, x: swelling

Measurement of copper foil coloration

A 75 μm-thick polyimide spacer was placed at one side on the smooth surface of a 35 μm-thick electrolytic copper foil, and the polyimidosiloxane solution (composition) was cast thereon and heated to dryness at 80° C. for 30 minutes and at 160° C. for 60 minutes. A 2×10 cm piece was cut out of the copper foil on which the protective film of the polyimidosiloxane mixture had been formed to a non-uniform thickness gradually changing from 5 to 40 μm, and was immersed for 5 minutes in a tin plating bath heated to 70° C. (Tinposit LT-34, product of Cypray Far East, KK.). After washing for 5 minutes with hot water at 70° C. or above, the foil was dried. Sections with partial coloring were found on the side of the copper foil on which the 5 to 40 μm-thick polyimidosiloxane protective film had been formed. The colored sections which had a protective film thickness of less than 20 μm were designated as "o", and those which had a protective film thickness of 20 μm or greater were designated as "∇".

Adhesion

Two spacers were placed on the rough side of a 35 μm-thick electrolytic copper foil or on a 75 μm-thick polyimide film, and the polyimidosiloxane solution (composition) was cast thereon and heated to dryness at 80° C. for 30 minutes and at 150° C. for 60 minutes, to form a protective film of the polyimidosiloxane composition with a film thickness of 20 to 30 μm. One mm-wide slits were made in the protective film according to JIS D0202 to form 100 reference marks, after which then adhesive tape was adhered thereto and peeled off, and the proportion of reference marks which did not peel was expressed as a percentage.

Flexibility (flexing resistance)

A spacer was placed on a 75 μm-thick polyimide film, and the polyimidosiloxane solution (composition) was cast thereon and heated to dryness at 80° C. for 30 minutes and at 150° C. for 60 minutes, to form a protective film of the polyimidosiloxane composition with a film thickness of 20 to 30 μm. The polyimide film was then bent with the protective film side facing outward, and the bent section was observed with a 50x microscope to check for cracking.

o: absolute no cracking, Δ: whitening at bent section, x: cracking

Viscosity change coefficient (storage stability)

The solution viscosity of the polyimidosiloxane solution composition was measured at 25° C. using an E-rotational viscometer manufactured by Tokyo Instruments. The viscosity change coefficient may be expressed by the following equation based on measurement of the solution viscosity (initial viscosity, η0) and the solution viscosity after 2 weeks (η1). (viscosity change coefficient)=(η1−η0)/η0×2+1

Preparation of polyimidosiloxane

Reference Example 1

Into a 500 ml glass flask there were charged 46.5 g (150 millimoles) of EDTA and 100 g TG, and the mixture was heated and stirred at 180° C. in a nitrogen atmosphere. There were then added 100.8 g (105 millimoles) of α,ω-bis(3-aminopropyl)polydimethylsiloxane (amino equivalents: 480, n=10.6) and 50 g TG, and the mixture was further heated and stirred at 180° C. for 60 minutes. To this reaction solution there were further added 3.2 g (15 millimoles) HAB, 12.3 g (30 millimoles) BAPP and 77 g TG, and the mixture was further heated and stirred at 180° C. for 6 hours, and the filtered. The resultant polyimidosiloxane reaction solution had a polymer solid concentration of 41 wt %, an ηinh of 0.17 and a solution viscosity of 30 poise. The imidation ratio was essentially 100%.

Reference Examples 2–14

The same procedure as in Reference Example 1 was followed, except that the acid dianhydrides and amine components listed in Table 1 were used, to obtain the polyimidosiloxane reaction solutions listed in Table 1.

EXAMPLE 1

Into a glass reactor there were charged 100 g of the polyimidosiloxane solution obtained in Reference Example 1 and 8.20 g of an epoxy resin (Epikote 157S-70, product of Yuka Shell), and the mixture was stirred at room temperature (25° C.) for 2 hours into a uniform solution to obtain a polyimidosiloxane solution composition (solution viscosity: 100 poise).

This solution composition maintained its homogeneous state without separating into solid and organic solvent even after standing for one week at room temperature.

This solution composition was also measured for the viscosity change coefficient, soldering heat resistance, copper foil coloring, flexibility and adhesion as described above.

The results are given in Table 2.

EXAMPLES 2–42

The same procedure as in Example 1 was followed, except for using the polyimidosiloxane reaction solutions and epoxy resins listed in Table 2, and depending on the case also mica [MK-100 (average particle size: 2.6 μm), manufactured by Cope Chemicals, KK., C-4000 (average particle size: 22 μm), manufactured by Shiraishi Industries, KK.] or barium sulfate [B-30 (average particle size: 0.3 μm) B-54 (average particle size: 1.2 μm), manufactured by Sakai Industries], to prepare uniform polyimidosiloxane solution compositions. The results are given in Tables 2, 3 and 4.

Comparative Examples 1–6

The same procedure as in Example 1 was followed, except for using the polyimidosiloxane reaction solutions and epoxy resins listed in Table 3.

TABLE 1

| Ref. Ex. No. | Tetra-carboxylic acid component Type | mmole | Diamine component [H₂N—R₂—NH₂] Type | Amino equiv. | [n] | (g) | mmole | Diamine component H₂N—R₃—NH₂ Type | mmole | Diamine component [H₂N—R₄—NH₂] Type | mmole | Solvent TG (g) | ηinh | Polyimidosiloxane reaction solution Polymer conc. (wt %) | Solution viscosity (poise) |
|---|---|---|---|---|---|---|---|---|---|---|---|---|---|---|---|
| 1 | ETDA | 150 | PSI | 480 | 10.6 | 100.8 | 105 | HAB | 15.0 | BAPP | 30.0 | 227 | 0.17 | 41 | 30 |
| 2 | DSDA | 150 | PSI | 480 | 10.6 | 100.8 | 105 | HAB | 15.0 | BAPP | 30.0 | 237 | 0.22 | 41 | 30 |
| 3 | a-BPDA | 120 | PSI | 630 | 15 | 132 | 84 | HAB | 12.0 | BAPP | 24.0 | 215 | 0.22 | 41 | 30 |
| 4 | a-BPDA | 150 | PSI | 450 | 9.8 | 94.5 | 105 | HAB | 22.5 | TPEQ | 22.5 | 206 | 0.20 | 41 | 15 |
| 5 | a-BPDA | 150 | PSI | 450 | 9.8 | 94.5 | 105 | HAB | 22.5 | BAPP | 22.5 | 212 | 0.25 | 41 | 30 |
| 6 | ETDA | 150 | PSI | 450 | 9.8 | 94.5 | 105 | HAB | 22.5 | BAPP | 22.5 | 215 | 0.25 | 41 | 70 |
| 7 | 6FDA | 150 | PSI | 450 | 9.8 | 94.5 | 105 | HAB | 37.5 | BAPP | 7.5 | 240 | 0.22 | 41 | 80 |
| 8 | a-BPDA | 150 | PSI | 430 | 9.2 | 90.3 | 105 | MBHA | 22.5 | BAPP | 22.5 | 206 | 0.25 | 41 | 30 |
| 9 | a-BPDA | 150 | PSI | 430 | 9.2 | 90.3 | 105 | FF | 22.5 | BAPP | 22.5 | 211 | 0.26 | 41 | 30 |
| 10 | a-BPDA | 150 | PSI | 480 | 10.6 | 100.8 | 105 | HAB | 15.0 | BAPP | 30.0 | 223 | 0.13 | 41 | 20 |
| 11 | ETDA | 150 | PSI | 480 | 10.6 | 100.8 | 105 | HAB | 15.0 | BAPP | 30.0 | 227 | 0.13 | 41 | 20 |
| 12 | a-BPDA | 150 | PSI | 480 | 10.6 | 100.8 | 105 | | | BAPP | 45.0 | 227 | 0.23 | 41 | 30 |
| 13 | a-BPDA | 150 | PSI | 430 | 9.2 | 90.3 | 105 | DABA | 22.5 | BAPP | 22.5 | 204 | 0.26 | 41 | 40 |
| 14 | a-BPDA | 150 | PSI | 420 | 9.0 | 88.2 | 105 | DABA | 22.5 | TPEQ | 22.5 | 201 | 0.26 | 41 | 30 |

TABLE 2

| Ex. | Polyimido-siloxane reaction solution | Amt. (g) | Epoxy | Amt. (g) | Soldering heat resistance | Flexibility | Copper foil adhesion | Polyimide film adhesion | Viscosity change coefficient |
|---|---|---|---|---|---|---|---|---|---|
| 1 | Ref. Ex. 1 | 100 | 157S-70 | 8.2 | o | o | 100 | 100 | 1.2 |
| 2 | Ref. Ex. 2 | 100 | 157S-70 | 8.2 | o | o | 100 | 100 | 1.2 |
| 3 | Ref. Ex. 3 | 100 | 157S-70 | 8.2 | o | o | 100 | 100 | 1.2 |
| 4 | Ref. Ex. 3 | 100 | 157S-70 | 12.3 | o | o | 100 | 100 | 1.4 |
| 5 | Ref. Ex. 3 | 100 | 1032H60 | 8.2 | o | o | 100 | 100 | 1.1 |
| 6 | Ref. Ex. 3 | 100 | 180S-75 | 8.2 | o | o | 100 | 100 | 1.2 |
| 7 | Ref. Ex. 4 | 100 | 157S-70 | 8.2 | o | o | 100 | 100 | 1.2 |
| 8 | Ref. Ex. 5 | 100 | 157S-70 | 8.2 | o | o | 100 | 100 | 1.2 |
| 9 | Ref. Ex. 6 | 100 | 157S-70 | 8.2 | o | o | 100 | 100 | 1.3 |
| 10 | Ref. Ex. 7 | 100 | 1032H60 | 8.2 | o | o | 100 | 100 | 1.2 |
| 11 | Ref. Ex. 8 | 100 | 157S-70 | 8.2 | o | o | 100 | 100 | 1.2 |
| 12 | Ref. Ex. 9 | 100 | 157S-70 | 8.2 | o | o | 100 | 100 | 1.2 |

TABLE 3

| Ex. | Polyimido-siloxane reaction solution | Amt. (g) | Epoxy | Amt. (g) | Mica | Amt. (g) | Soldering heat resistance | Copper foil coloring | Flexibility | Copper foil adhesion | Polyimide film adhesion |
|---|---|---|---|---|---|---|---|---|---|---|---|
| 13 | Ref. Ex. 1 | 100 | 1032H60 | 8.2 | MK-100 | 20 | o | o | o | 100 | 100 |
| 14 | Ref. Ex. 2 | 100 | 157S-70 | 8.2 | MK-100 | 20 | o | o | o | 100 | 100 |
| 15 | Ref. Ex. 3 | 100 | 157S-70 | 8.2 | MK-100 | 20 | o | o | o | 100 | 100 |
| 16 | Ref. Ex. 3 | 100 | 157S-70 | 12.3 | MK-100 | 15 | o | o | o | 100 | 100 |
| 17 | Ref. Ex. 3 | 100 | 157S-70 | 8.2 | C-4000 | 20 | o | o | o | 100 | 100 |
| 18 | Ref. Ex. 3 | 100 | 1032H60 | 8.2 | MK-100 | 20 | o | o | o | 100 | 100 |
| 19 | Ref. Ex. 3 | 100 | 180S-75 | 8.2 | MK-100 | 20 | o | o | o | 100 | 100 |
| 20 | Ref. Ex. 4 | 100 | 157S-70 | 8.2 | MK-100 | 20 | o | o | o | 100 | 100 |
| 21 | Ref. Ex. 5 | 100 | 157S-70 | 8.2 | MK-100 | 6 | o | o | o | 100 | 100 |
| 22 | Ref. Ex. 5 | 100 | 157S-70 | 8.2 | MK-100 | 20 | o | o | o | 100 | 100 |
| 23 | Ref. Ex. 5 | 100 | 157S-70 | 8.2 | MK-100 | 30 | o | o | Δ | 100 | 100 |
| 24 | Ref. Ex. 6 | 100 | 157S-70 | 8.2 | MK-100 | 20 | o | o | o | 100 | 100 |
| 25 | Ref. Ex. 7 | 100 | 1032H60 | 8.2 | MK-100 | 20 | o | o | o | 100 | 100 |
| 26 | Ref. Ex. 8 | 100 | 157S-70 | 8.2 | MK-100 | 20 | o | o | o | 100 | 100 |
| 27 | Ref. Ex. 9 | 100 | 157S-70 | 8.2 | MK-100 | 20 | o | o | o | 100 | 100 |

TABLE 4

| Ex. | Polyimido-siloxane reaction solution | Amt. (g) | Epoxy | Amt. (g) | Barium sulfate | Amt. (g) | Soldering heat resistance | Copper foil coloring | Flexi-bility | Copper foil adhesion | Polyimide film adhesion |
|---|---|---|---|---|---|---|---|---|---|---|---|
| 28 | Ref. Ex. 1 | 100 | 1032H60 | 8.2 | B-30 | 20 | ○ | ○ | ○ | 100 | 100 |
| 29 | Ref. Ex. 2 | 100 | 157S-70 | 8.2 | B-30 | 20 | ○ | ○ | ○ | 100 | 100 |
| 30 | Ref. Ex. 3 | 100 | 157S-70 | 8.2 | B-30 | 20 | ○ | ○ | ○ | 100 | 100 |
| 31 | Ref. Ex. 3 | 100 | 157S-70 | 12.3 | B-30 | 15 | ○ | ○ | ○ | 100 | 100 |
| 32 | Ref. Ex. 3 | 100 | 157S-70 | 8.2 | B-54 | 20 | ○ | ○ | ○ | 100 | 100 |
| 33 | Ref. Ex. 3 | 100 | 1032H60 | 8.2 | B-30 | 20 | ○ | ○ | ○ | 100 | 100 |
| 34 | Ref. Ex. 3 | 100 | 180S-75 | 8.2 | B-30 | 20 | ○ | ○ | ○ | 100 | 100 |
| 35 | Ref. Ex. 4 | 100 | 157S-70 | 8.2 | B-30 | 20 | ○ | ○ | ○ | 100 | 100 |
| 36 | Ref. Ex. 5 | 100 | 157S-70 | 8.2 | B-30 | 6 | ○ | ○ | ○ | 100 | 100 |
| 37 | Ref. Ex. 5 | 100 | 157S-70 | 8.2 | B-30 | 20 | ○ | ○ | ○ | 100 | 100 |
| 38 | Ref. Ex. 5 | 100 | 157S-70 | 8.2 | B-30 | 30 | ○ | ○ | Δ | 100 | 100 |
| 39 | Ref. Ex. 6 | 100 | 157S-70 | 8.2 | B-30 | 20 | ○ | ○ | ○ | 100 | 100 |
| 40 | Ref. Ex. 7 | 100 | 1032H60 | 8.2 | B-30 | 20 | ○ | ○ | ○ | 100 | 100 |
| 41 | Ref. Ex. 8 | 100 | 157S-70 | 8.2 | B-30 | 20 | ○ | ○ | ○ | 100 | 100 |
| 42 | Ref. Ex. 9 | 100 | 157S-70 | 8.2 | B-30 | 20 | ○ | ○ | ○ | 100 | 100 |

TABLE 5

| Comp. Ex. | Polyimido-siloxane reaction solution | Amt. (g) | Epoxy | Amt. (g) | Inorganic substance | Amt. (g) | Soldering heat resistance | Copper foil coloring | Flexi-bility | Copper foil adhesion | Polyimide film adhesion | Viscosity change coefficient |
|---|---|---|---|---|---|---|---|---|---|---|---|---|
| 1 | Ref. Ex. 10 | 100 | 157S-70 | 8.2 | — | None | □ | — | ○ | 100 | 100 | 1.2 |
| 2 | Ref. Ex. 10 | 100 | 1032H60 | 8.2 | — | None | □ | — | ○ | 100 | 100 | 1.2 |
| 3 | Ref. Ex. 11 | 100 | 157S-70 | 8.2 | — | None | □ | — | ○ | 100 | 100 | 1.2 |
| 4 | Ref. Ex. 12 | 100 | 1575-70 | 8.2 | — | None | □ | □ | ○ | 100 | 100 | 1.2 |
| 5 | Ref. Ex. 13 | 100 | 157S-70 | 8.2 | — | None | ○ | — | ○ | 100 | 100 | 1.9 |
| 6 | Ref. Ex. 14 | 100 | 157-70 | 8.2 | — | None | ○ | — | ○ | 100 | 100 | 1.9 |

The polyimidosiloxane compositions according to the present invention which comprise an organic solvent-soluble polyimidosiloxane, an epoxy resin and an organic solvent, and, optionally asto, mica or barium sulfate, have excellent storage stability.

Cured products obtained by heating the polyimidosiloxane compositions of the invention undergo little viscosity change of the compositions even with long-term storage and thus exhibit excellent storage stability, while the heat-dried and cured thin-films have excellent flexing resistance, heat resistance, adhesion, chemical resistance (particularly against soldering flux and tin plating solutions) and soldering (heat) resistance and are adherent to substrates such as copper and polyimide films, allowing formation of excellent protective films without requiring pretreatment of substrates with silane coupling agents or other adhesion accelerators.

We claim:

1. A polyimidosiloxane composition comprising (a) 100 parts by weight of an organic solvent-soluble polyimidosiloxane comprising structural units represented by the formula (1),

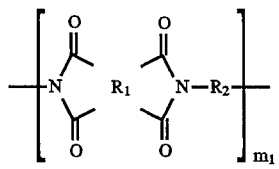

(1)

formula (2),

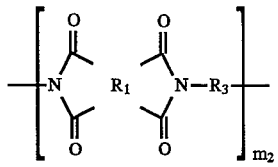

(2)

and formula (3),

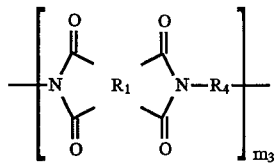

(3)

wherein:

$R_1$, represents a tetravalent residue of an aromatic tetracarboxylic acid without the tetracarboxylic acid;

$R_2$ represents a divalent residue of a diaminopolysiloxane having the formula (4) without the amino groups

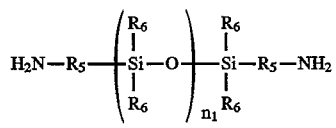

(4)

wherein $n_1$ ranges from 3 to 30, each $R_5$ independently represents a divalent hydrocarbon group, and each $R_6$ independently represents an alkyl group with 1–3 carbon atoms or a phenyl group;

$R_3$ represents a divalent residue of an aromatic diamine compound represented by formula (5) without the amino groups,

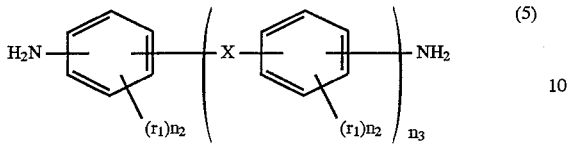

wherein $r_1$ represents a hydroxy group, $n_2$ represents 1 or 2, $n_3$ represents zero or an integer from 1 to 3, and X represents a direct bond or a divalent group selected from

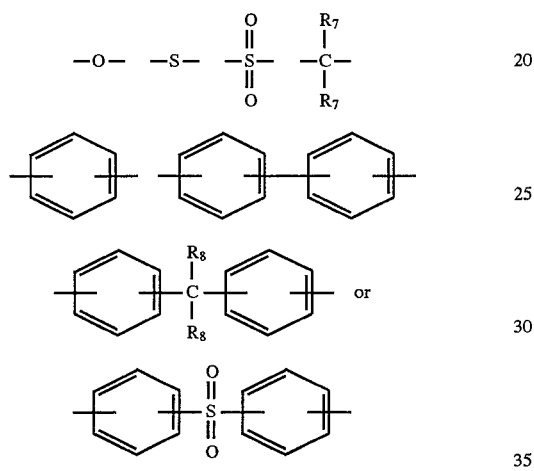

wherein $R_7$ and $R_8$ each independently represent hydrogen, methyl or halogenated methyl;

$R_4$ represents a divalent residue of a diamine compound other than the diamine compounds represented by formulae (4) and (5) without the amino groups; and $m_1$ is 45 to 80 mole percent, $m_2$ is 0.5 to 40 mole percent, and $m_3$ is (100-$m_1$-$m_2$) mole percent;

(b) 1 to 50 parts by weight of an epoxy resin, and (c) an organic solvent.

2. The composition according to claim 1, wherein $m_1$ is 50 to 75 mole percent, $m_2$ is 5 to 35 mole percent and $m_3$ is 5 to 45 mole percent.

3. The composition according to claim 1, wherein the polyimidosiloxane has an inherent viscosity of 0.16 or greater.

4. The composition according to claim 1 further comprising 2 to 150 parts by weight of at least one inorganic substance selected from mica or barium sulfate per 100 parts by weight polyimidosiloxane.

5. The composition according to claim 1, wherein the organic solvent is a nitrogen-containing organic solvent.

6. The composition according to claim 1, wherein the organic solvent is a diglyme-based solvent.

7. A cured product obtained by heating a polyimidosiloxane composition comprising (a) 100 parts by weight of an organic solvent-soluble polyimidosiloxane comprising structural units represented by the formula (1),

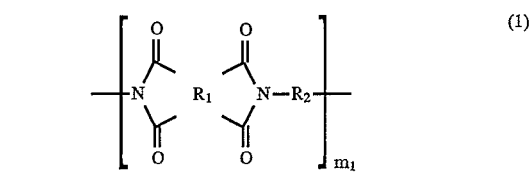

formula (2),

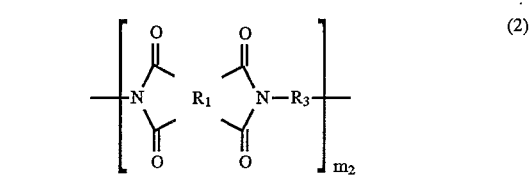

and formula (3)

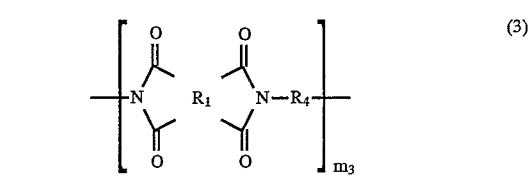

wherein:

$R_1$, represents a tetravalent residue of an aromatic tetracarboxylic acid without the tetracarboxylic acid;

$R_2$ represents a divalent residue of a diaminopolysiloxane having the formula (4) without the amino groups

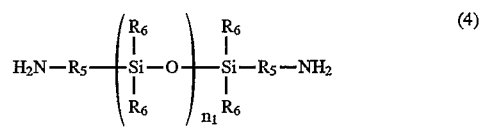

wherein $n_1$ ranges from 3 to 30, each $R_5$ independently represents a divalent hydrocarbon group, and each $R_6$ independently represents an alkyl group with 1–3 carbon atoms or a phenyl group;

$R_3$ represents a divalent residue of an aromatic diamine compound represented by formula (5) without the amino groups,

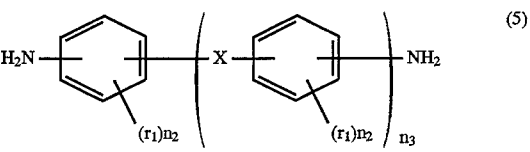

wherein $r_1$ represents a hydroxy group, $n_2$ represents 1 or 2, $n_3$ represents zero or an integer from 1 to 3, and X represents a direct bond or a divalent group selected from

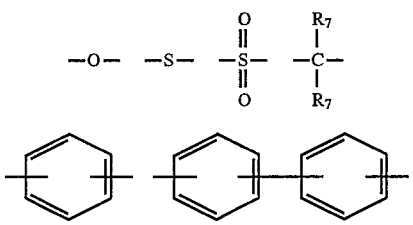

-continued

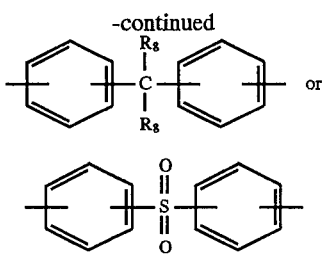

wherein $R_7$ and $R_8$ each independently represent hydrogen, methyl or halogenated methyl;

$R_4$ represents a divalent residue of a diamine compound other than the diamine compounds represented by formulae (4) and (5) without the amino groups; and $m_1$ is 45 to 80 mole percent, $m_2$ is 0.5 to 40 mole percent, and $m_3$ is $(100-m_1-m_2)$ mole percent;

(b) 1 to 50 parts by weight of an epoxy resin, and (c) an organic solvent.

8. The cured product according to claim 7, wherein $m_1$ is 50 to 75 mole percent, $m_2$ is 5 to 35 mole percent and $m_3$ is 5 to 45 mole percent.

9. The cured product according to claim 7, wherein the polyimidosiloxane has an inherent viscosity of 0.16 or greater.

10. The cured product according to claim 7, further comprising 2 to 150 parts by weight of at least one inorganic substance selected from mica or barium sulfate per 100 parts by weight polyimidosiloxane.

11. A coating composition comprising a solution prepared by dissolving a polyimidosiloxane, having solubility in organic solvents, at least one epoxy group-reactable polar group in the molecule, and an inherent viscosity of 0.16 or greater, and an epoxy resin in an organic solvent, wherein the viscosity change coefficient of the composition is 1.5 or less.

12. The composition according to claim 11, wherein the inherent viscosity of the polyimidosiloxane ranges from 0.17 to 2.

13. The composition according to claim 11 further comprising at least one of mica or barium sulfate.

14. The composition according to claim 11, wherein the organic solvent is a nitrogen-containing organic solvent.

15. The composition according to claim 11, wherein the organic solvent is a diglyme-based solvent.

* * * * *